(12) United States Patent
Kojo

(10) Patent No.: US 9,289,690 B2
(45) Date of Patent: *Mar. 22, 2016

(54) COMPUTING OF SOCIAL GAME

(71) Applicant: DeNA Co., Ltd., Tokyo (JP)

(72) Inventor: Taku Kojo, Tokyo (JP)

(73) Assignee: DeNA Co., Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/480,287

(22) Filed: Sep. 8, 2014

(65) Prior Publication Data

US 2015/0005069 A1    Jan. 1, 2015

Related U.S. Application Data

(63) Continuation of application No. 13/766,619, filed on Feb. 13, 2013, now Pat. No. 8,834,275.

(30) Foreign Application Priority Data

Feb. 14, 2012 (JP) .................................. 2012-029763

(51) Int. Cl.
| | |
|---|---|
| *A63F 13/12* | (2006.01) |
| *A63F 13/822* | (2014.01) |
| *A63F 13/30* | (2014.01) |
| *A63F 13/795* | (2014.01) |
| *A63F 13/335* | (2014.01) |
| *A63F 13/88* | (2014.01) |
| *A63F 13/67* | (2014.01) |

(52) U.S. Cl.
CPC .............. *A63F 13/822* (2014.09); *A63F 13/12* (2013.01); *A63F 13/335* (2014.09); *A63F 13/67* (2014.09); *A63F 13/795* (2014.09); *A63F 13/88* (2014.09)

(58) Field of Classification Search
CPC ...................................................... A63F 13/12
See application file for complete search history.

(56) References Cited

U.S. PATENT DOCUMENTS

| | | | |
|---|---|---|---|
| 2007/0167204 A1 | 7/2007 | Lyle et al. | |
| 2008/0161113 A1* | 7/2008 | Hansen et al. | 463/42 |
| 2013/0059657 A1 | 3/2013 | Olomskiy | |
| 2013/0237326 A1 | 9/2013 | Arnone et al. | |

FOREIGN PATENT DOCUMENTS

| | | | |
|---|---|---|---|
| JP | 2002-306837 | A | 10/2002 |
| JP | 2006-520053 | A | 8/2006 |
| JP | 2008-510563 | A | 4/2008 |
| JP | 2008510563 | A | 4/2008 |

(Continued)

*Primary Examiner* — Omkar Deodhar
(74) *Attorney, Agent, or Firm* — Rothwell, Figg, Ernst & Manbeck, P.C.

(57) ABSTRACT

A method for computing a social game in a social media providing a computing environment in which members are visualized with their avatars respectively associated with the members and the members socialize. An environment in which the members play a master game and a slave game is provided, in which the slave game is a battle card game. Playing history data of the master game and playing history data of the slave game are stored and managed. The playing history data card information of cards possessed by each of the members is described; and a process of managing the slave game is provided, the process including a card-issuing process in which a member-avatar card that is used for playing the card game and is derived from each member is issued and is possessed by any of the members.

6 Claims, 4 Drawing Sheets

(56) References Cited

FOREIGN PATENT DOCUMENTS

| | | |
|---|---|---|
| JP | 2008-136631 A | 6/2008 |
| JP | 2009-510561 A | 3/2009 |
| JP | 2011-45792 A | 3/2011 |
| JP | 2011045792 A | 3/2011 |
| JP | 4855549 B1 | 1/2012 |

* cited by examiner

AVATAR SETTING INFORMATION

| AVATAR ELEMENT | AVATAR ID |
|---|---|
| AVATAR ELEMENT1 | 100001 |
| AVATAR ELEMENT2 | 200003 |
| AVATAR ELEMENT3 | 300010 |
| AVATAR ELEMENT4 | 400024 |
| AVATAR ELEMENT5 | 500008 |
| AVATAR ELEMENT6 | 600016 |
| ⋮ | ⋮ |
| AVATAR ELEMENT14 | 1400021 |

FIG. 2

COMPUTING OF SOCIAL GAME

CROSS-REFERENCE TO RELATED APPLICATIONS

This application is a continuation of U.S. application Ser. No. 13/766,619, filed Feb 13, 2013 which claims priority from Japanese Patent Application No. 2012-029763 filed on Feb 14, 2012. The disclosures of each of the above-referenced applications are herein incorporated by reference in their entirety.

BACKGROUND

1. Technical Field

This invention relates to computing of a social game, particularly to a technique in which applying a new system that has never been known to the social game increases the pleasure thereof. As well known, a social game refers to an online game which is provided on a social networking service (SNS) and which a user plays while communicating with other users.

2. Related Art

In Mobage (R) which is a social media operated by the applicant, a user of a mobile phone, a smartphone, or the like can be registered as a member for free without an invitation from any other member. The member can use various services of SNS such as diary, BBS, avatar, and message exchange. Also, the member can play online games and use accompanying services such as a chat function. It is well known that various social media with similar tastes are operated in Japan and overseas and that a large number of people in the world use SNSs and social games.

SUMMARY

An advantage of this invention is to achieve a card game having a new scheme, in social media that provides social games.

An aspect of the invention to solve the above problem is a method for computing a social game in a social media providing a computing environment in which members are visualized with their avatars respectively associated with the members and the members socialize, including:

including an environment in which the members play a master game and a slave game;

storing and managing, for each of the members, playing history data of the master game and playing history data of the slave game;

having the slave game that is a battle card game;

describing in the playing history data card information of cards possessed by each of the members;

having a process of managing the slave game, the process including a card-issuing process in which a member-avatar card that is used for playing the card game and is derived from each member is issued and is possessed by any of the members;

producing the member-avatar card as a character card in which each member is visualized with an avatar associated with the member; and setting a battle parameter of a member-avatar card derived from a certain member based on a content that is recorded as the certain member's playing history data of the master game at the time of issuing of the card.

BRIEF DESCRIPTION OF THE DRAWINGS

FIG. 2 is a diagram showing the outline of avatar setting information.

DESCRIPTION OF EXEMPLARY EMBODIMENTS

Figure 1:
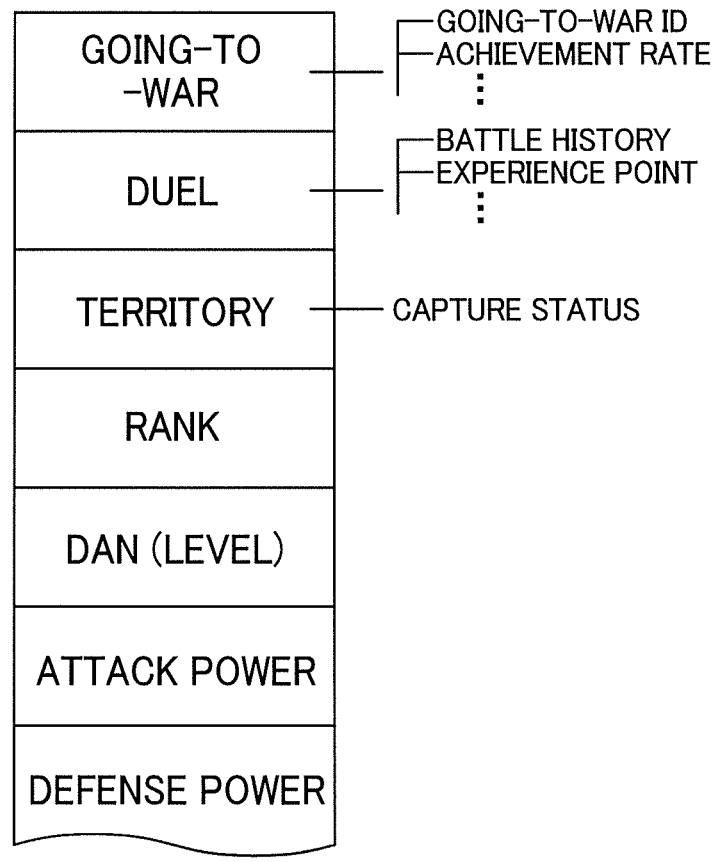
FIG. 1 is a diagram showing the outline of playing history data of the master game.

Outline of Social Media and Social Game

The social media provides a computing environment, as a basic system for computing, that allocates storage resources to each member (which is referred to as member information areas), records in the member information areas information transmitted by each member and information that produces according to the members' activity (which are collectively referred to as member information) to show the recorded member information to people other than the member himself, and enables the members and the other people to put comments on the information they have seen.

In the social media, personal information, socialization information, and socialization management information of each member are stored as correlated to a personal ID (an account) and managed. The personal information includes a password, a name, an age, an address, a phone number, an email address, a terminal identification information and contractor identification information of a mobile phone, and the like. The socialization information typically includes information of a blog posted by a member with related information such as others' comments to the blog posting, photos and movies as posted, postings on an electronic bulletin board, and web mails. The socialization information constitutes a substantive part of information to be exchanged among members in the social media.

The social media provides a computing environment for creating community with mutually linked members where information transmitted by one member is communicated to another member in the same community. The social media is constructed with a composite of services such as a blog, a web mail, an electronic bulletin board, a chat function, and a game that are to be used by members. The number of users is steeply increasing in the social media called Twitter (R).

The social game included in the social media provides a computing environment in which a game is played with a plurality of users while they affect each other. In the social game named "Kaito Royale" (R) which can be played in Mobage, a user plays a role of a leader of a thief group, earns money by completing missions, and challenges other members to steal their treasures. Sometimes a user founds partnership with other users to play the game together and they give digital items such as a weapon, a protector, a vehicle, and/or treasures to each other. As a similar game, "Sengoku Royale" (R) is well-known.

In the social game, the game information is stored for each member and managed in the same manner as the foregoing description of the social media. In the game information, playing history data (including the current status) are described. When a member accesses the game information on the social media with a terminal such as a mobile phone and a smartphone, a game image is displayed on a terminal screen and the member can play the game from his/her terminal. One feature of the social game is that the game information is accessible by others and the member's game information is updated by others' interference actions.

Further, in the social game, the identifiers (item identification information) of game items (digital items), such as a weapon, a protector, and a vehicle to be used in a scene where the game is played, are described as correlated to an item possession list included in the game information for each member.

Users can purchase the game items (digital items) to be sold or acquire the game items provided for free on the social game. The identification information of the acquired digital items is recorded as correlated to the user's own item possession list. Based on such a record, the possessed game items can be used timely in a game play scene or an information sharing scene, thereby providing a change to a game progress status, and/or providing a change to an information sharing scene.

The social game is configured to compile the information about the provided game items into a database and manage it. The information about the game items includes: the text information containing names, prices, etc., of the items; the visualization information when showing users the game items on terminal screens; the attack capability value and the defense capability value that affect by game items to game progress, and the like.

Using the information resource constituted as described above, a computing system of the social media communicates with the members making accesses with an information communication terminal such as a mobile phone, a smartphone, a personal computer and a mobile game machine. In addition, the computing system executes information processing of SNS, and executes information processing of social games, such as Kaito Royale and Sengoku Royale, and various games to be enjoyed individually.

Avatar of Each Member

As well known, in the social media, members are each visualized on their own avatars (alter egos) and can be identified in appearance. In addition thereto, customization of avatar enables the members to represent themselves. The avatar is configured as digital data, and the same computing as the foregoing game items allows members to choose their favorite ones from various avatars. Also, the members can choose their favorite ones from various ornaments, etc. and dress their own avatars therein. Avatar setting information of each member is registered in a member information area. The avatar setting information consists of an avatar basic element and an avatar additional element which corresponds to the foregoing ornaments, etc.

Card Game

As a genre of social games, a battle-type card game is well-known. It can be said that the card game is an online game in which a conventionally-known real card game that uses real cards is digitized and is played over a network. The digitized cards represent various characters, and battle parameter which refers to an attack power, a defense power, etc. is set for each of the cards. The members can acquire a plurality of cards by accessing the card game section of a social media (referring to a whole computing environment which executes card games).

The member's card-possession information is registered in the member information area as a piece of game information. For example, two members access the card game section and battle with each other. When each member selects a predetermined number of cards from his/her own cards and shows the selected cards on a field of the battle, a computation for the battle is executed by software of the card game section, and the result of the battle is notified to both members. If, for example, it is conditioned that a winning member acquires a card possessed by a defeated member, data processing for updating card-possession information is performed according to the result of the battle.

As mentioned above, members can acquire a card by winning a battle of a card game. Also, the card game section has a virtual card dispenser (which is referred to as a Gacha), which enables each member to acquire a card for free or at cost. However, the member cannot request the card dispenser to dispense a specific card. The card is dispensed which is selected by the card dispenser according to a certain algorithm. Therefore, the member does not know which card will be dispensed. Furthermore, the members can acquire a card by exchanging their own cards among the members without playing the card game.

A new card game related to the present invention is a slave game whose master game is another social game, the slave game is dependently linked to its master game. In the following description, some members are respectively referred to as Taro, Hanako, Jiro, and the like for the purpose of providing a clear description.

A member Taro plays, at any time he likes, a social game that is a master game. Taro's playing history data of the master game is recorded in a Taro information area (the member information area for Taro). The playing history data includes updated data of the followings: a progression rate indicating of the stage of the master game which a member has already completed; points gained in the game; a game score; and the like.

Management means of a card game which is a slave game issues a Taro avatar card, which is derived from Taro and reflects Taro's playing history data of the master game and avatar information; the playing history data and the avatar information both are recorded in the Taro information area. And, the management means provides means by which Taro himself or any of other members acquires the card. If Taro possesses the Taro avatar card, possession information of the Taro avatar card is described in the game information of the slave game which is recorded in the Taro information area.

The Taro avatar card has an appearance of a character card indicative of the avatar which Taro uses. The battle parameter of the Taro avatar card (data such as an attack power and a defense power) are determined based on playing history data of the master game at the point of time when the card is issued by the card game section and is acquired by a member; the playing history data is one that is recorded in the Taro information area, which is for Taro who is the derivation of the card.

In January 2012, Taro himself acquired a Taro avatar card (X) from the card game section of the slave game. Playing history data of the master game that was recorded in the Taro information area at this point of time is called as data A1. The battle parameter B1 of the Taro avatar card (X) which Taro acquired is determined based on the data A1.

In February 2012, Taro and Hanako battled in a card game of the slave game. Taro used the foregoing Taro avatar card (X) and was defeated by Hanako. Hanako who won the battle acquired the Taro avatar card (X) from Taro. The battle parameter of the Taro avatar card which Hanako acquired is the foregoing battle parameter B1.

On Mar. 1, 2012, Taro played the master game. As a result, the playing history data of the master game recorded in the Taro information area has improved from the data A1 to data A2 (a score has become better).

On Mar. 2, 2012, Jiro acquired a Taro avatar card (Y) from the card game section of the slave game. At this point of time, the playing history data of the master game recorded in the Taro information area is updated to data A2, and the battle parameter of the Taro avatar card (Y) which Jiro acquired is the battle parameter B2 which is determined based on the updated data A2.

In April 2012, Jiro and Sabro battled in the card game of the slave game. Jiro used the Taro avatar card (Y) and was defeated by Sabro. The battle parameter B2 of the Taro avatar card (Y) used in this battle is one that is determined based on the data A2, and differs from the battle of Taro and Hanako in February 2012 (e.g. becomes stronger). Sabro who won the battle acquired the Taro avatar card (Y). The battle parameter of the Taro avatar card (Y) which Sabro acquired is the foregoing battle parameter B2.

Effect of the Invention

For example, one million members enjoy the master game and the slave game. In this case, one million types of member-avatar cards which are derived from one million members are circulated in a social place of the slave game (card game). Further, it is usual to issue a plurality of member-avatar cards which is derived from one member. Also, it is usual that the member-avatar cards which are derived from one member are not the same in battle parameter, and but different depending on the time of issuing each card.

As mentioned above, according to this invention, there are a large number of types of the member-avatar cards which automatically increase as members increase. This achieves a card game which is far more attractive than existing card games. In addition, those various cards are linked to respective members through the avatars as mentioned above which will be a never-before existing appeal.

In order to issue in the slave game a Taro avatar card having a good battle parameter, Taro plays the master game and makes an effort to improve score data. Hanako attempts to acquire the popular Taro avatar card having a good battle parameter, and she plans missions of the slave game. As mentioned above, combined effects produced by linking the master game and the slave game makes it more enjoyable to participate in games, which activates the social media.

One typical example of this invention is assumed to be a new service in Mobage, which is a social media operated by the applicant. An example of the foregoing master game is assumed to be "Sengoku Royale," which is well-known. The foregoing slave game which is dependently linked to this master game is the new battle card game to be described below. An environment for executing the new battle card game is constructed. Note that "Chronicle of Horse Racing" is well-known as a battle card game in Mobage.

There are various websites of social media including social games, i.e. Mobage, which are used by a large number of people. For most of computing engineers who are involved in the construction of such websites, an architecture of social media of this type is a well-known common technical matter. As will become evident below, this invention is one that is realized by using some software-related technique for well-known common social media. New technical matters related to the core of the present invention will be mainly described in the present specification, and well-known common matters will not be described for avoiding redundancy.

Master Game

As well known, "Sengoku Royale," which serves as the master game, is a multi-player role-playing game (RPG) in which players proceed the game by mainly performing going-to-wars and duels in order to unify Japan and socialize with other warrior-commander. A player becomes a general of warrior-commanders. The player executes a mission ("going-to-war" in the game) to earn a war chest (a unit is Ryo) and defeats warrior-commanders in various areas to extend their territories. In parallel, the player duels another player to rob him/her of treasures and is given a territory by the emperor's government. In some cases, the player becomes friends with other users; they give an item (weapon, protector, and vehicle) or treasures to one another, and cooperate in duel by assisting one another. The players' final aim is to unify the country. The process of going-to-war proceeds basically as follows.

(1) A player executes a mission, gains experience points and capital, and increase his/her level "Dan".
(2) When mission is executed, units the number of which is predetermined for each mission are consumed.
(3) The player earns money, purchases a weapon, a protector, and a vehicle, and increases his/her attack power and defense power.
(4) When a mission is completed, the enemy general appears. The player can battle the enemy general together with warrior-commander friends.
(5) A General game is RPG-like command battle playing in turns.
(6) If the player defeats a warrior-commander, he/she can execute upper-level missions. If the player defeats the same warrior-commander three times, he/she has completely defeated the warrior-commander and acquires the territory of the warrior-commander.

Playing History Data of Master Game

In the social media of the present example, a computing environment for executing games (hereinafter referred to as a master game section) of "Sengoku Royale," which is a master game, stores and manages for each member playing history data of "Sengoku Royale". An outline of the playing history data for one member is shown in FIG. 1. The playing history data includes the followings as data components related to this invention: "going-to-war" data for managing the content of each mission; "duel" data of a duel with another player; "territory" data of a territory acquired by defeating warrior-commanders in other areas; "rank" data indicative of the rank of the defeated warrior-commander; "Dan" data which is promoted according to results of missions; "attack power" and "defense power" data which are updated by execution of a mission or purchase of a weapon, a protector, etc.; and the like.

Avatar Setting Information

As described in Related Art, in the social media of the present example, member registration information is stored and managed for each member, and member registration information includes avatar setting information. Avatar's appearance and expression are structured and systematized so that avatar's appearance and expression are realized by an appropriate combination of avatar element components which consist of 10-20 components. To the avatar element components, respectively associated are the avatar IDs corresponding to parts the member selected. The avatar element component can be classified into the following two types of elements: element components which are essential as the avatar setting information such as a component associated with parts of the avatar's head, a component associated with parts of the avatar's body, etc.; and optional elements that can be selected at will such as an accessory or a handbag which the avatar wears. The former of the avatar element components is called as an avatar basic element, and the latter is called as an avatar additional element. The outline of the avatar setting information in the member registration information for one member is shown in FIG. 2.

Playing History Data of Slave Game

Figure 3:
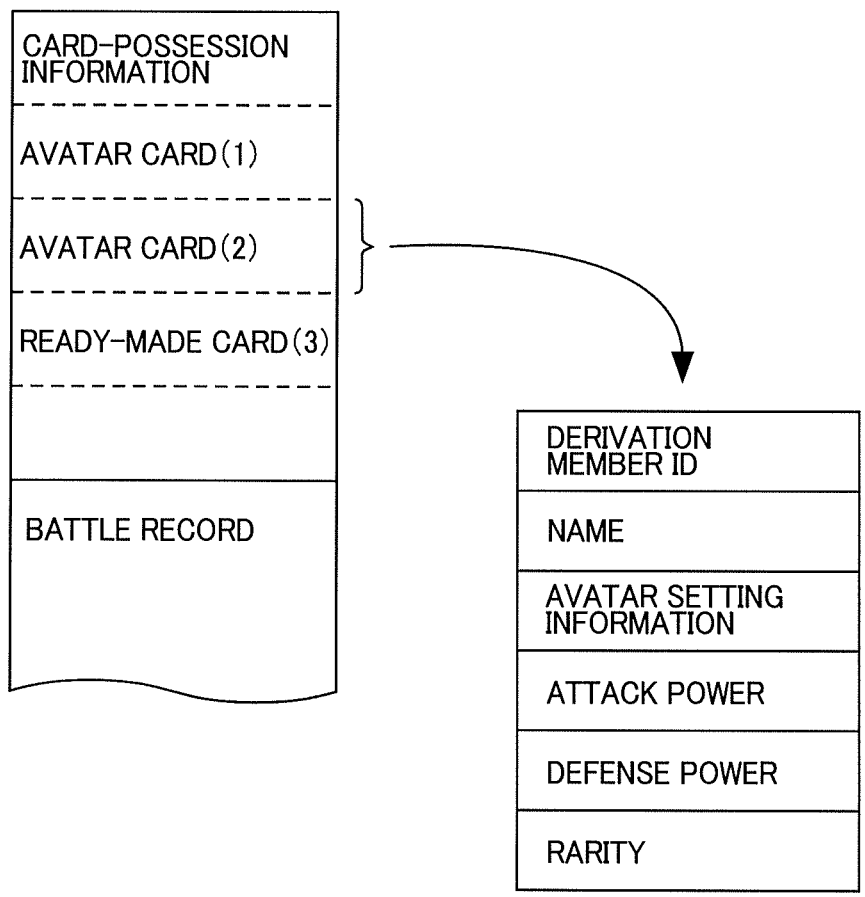
FIG. 3 is a diagram showing the outline of playing history data of the slave game.

In the social media of the present example, a computing environment for executing games (hereinafter referred to as a slave game section) of a new card game (hereinafter referred to as a "warrior-commander card battle"), which is a slave game, stores and manages for each member playing history data of "warrior-commander card battle". An outline of the playing history data for one member is shown in FIG. 3. The playing history data includes card-possession information and battle record. In the battle record, described are contents and results of the past battles of the member.

The card-possession information is a list of pieces of card-identification information which identify a plurality of cards possessed by the member. This card-identification information includes identification information of the foregoing member-avatar card, which relates to the core of this invention.

Identification Information of Member-Avatar Card

As shown in FIG. 3, the identification information of the member-avatar card includes: a derivation member ID indicative of the member who is the derivation of the issued card; a name of the member; avatar setting information of the derivation member at the time of issuing of the card; data of battle parameter of the card such as an attack power and a defense power; data of rarity indicative of a scale of five grades into which the combinations of the attack power and the defense power are evaluated; and the like.

Visualization Process of Member-Avatar Card

Figure 4:
FIG. 4 is a diagram showing 5 examples of visualized member-avatar cards.

The member-avatar card is visualized in the form of the character cards shown as the five examples in FIG. 4, for example, on a display of a user terminal (i.e. a mobile phone, a smartphone, a personal computer, and a game machine). Before describing a process of issuing these avatar cards, a visualization process based on the identification information of the member-avatar card will be described.

While the slave game section is communicating with a user terminal and is processing the progression of the game, if a member-avatar card designated by the user is going to be displayed on a display of the user terminal, the visualization process is performed mainly by the slave game section. The slave game section performs the process as follows: the slave game section picks up the member-avatar card identification information to be processed; then, the slave game section generates image data of an avatar's appearance based on the avatar setting information in the identification information and foam-design information (stored in the slave game section), and generates visualization data including image data of the attack power, the defense power, the rarity, and the name; and the game section sends to the user terminal the visualization data.

It is desirable to visualize to a card not only the basic elements in the avatar setting information associated with the avatar's head and body but also the additional elements such as avatar's clothes, ornamental items, etc. This encourages members to acquire the avatar additional element, and increases the variety of cards.

The visualization data of the member-avatar card is described, for example, in SWF file format which supports FlashPlayer (R) or in HTML file format which supports HTML 5. On a user terminal which has received this visualization data, the member-avatar card is displayed as shown in FIG. 4.

Ready-Made Card and its Visualization Process

In the slave game "warrior-commander card battle," for playing the game, it is possible to use not only the member-avatar cards derived from the members but also various ready-made cards provided by the game provider. Each of these ready-made cards is specified by a unique card ID. Correlating with the card ID, the slave game section stores and manages card detail information (including data of visualization information, the attack power, the defense power, and the rarity).

While the slave game section is communicating with a user terminal and are processing the progression of the game, if a ready-made card designated by the user is going to be displayed on a display of the user terminal, the slave game section performs as follows: the slave game section picks up the card detail information based on the card ID of that ready-made card; then, the slave game section generates visualization data of that ready-made card based on the information in SWF file format or HTML file format; and the game section sends the data to the user terminal. On the user terminal which has received the data, the ready-made card whose appearance is similar to the examples of FIG. 4 is displayed.

Time of Issuing Member-Avatar Card and Member-Avatar Card Identification Information In the foregoing section, described is that the member-avatar card identification information includes the derivation member's member ID, name and avatar setting information. The avatar setting information mentioned here is the one that is recorded as registration information of the derivation member at the time of issuing of the card (to be described later).

Similarly, attack power data and defense power data in the member-avatar card identification information are determined based on history data which is recorded in the derivation member's playing history data of the master game at the point of time when the card is issued. For example, these data are calculated based on any one or more of the following data: the rank of a warrior-commander whom the member has defeated in the master game; a territory acquired as a result of a going-to-war; an attack power and a defense power which are updated by execution of a mission or purchase of a weapon, a protector, etc.; the "Dan" data associated with mission results; and the like. The calculation algorithm is prepared the slave game section; for example, the higher the rank a warrior-commander has in the master game, the higher the rarity in the member-avatar card identification information becomes, which makes the attack power data and the defense power data better (battle parameter stronger).

Bonus of Special Avatar Additional Element

In the social media of the present example, in some cases, a certain event takes place, and special avatar additional elements called as "rare avatars" (i.e., special accessories worn by avatars) are issued and is possessed by a small number of the members. In the card-issuing process the slave game, when a member-avatar card derived from a certain member A is issued to the member A or another member, if the avatar setting information of the derivation member A includes the abovementioned rare avatar (special avatar additional element), a bonus is added to the attack power data and the defense power data of the member-avatar card to be issued, which makes the card stronger. This encourages the members to participate in the event, and produces a circulation effect of rare cards.

Card-Dispensing Process

A typical card-issuing process is a well-known "Gacha". The card-issuing process responds to a user's request of acquisition of a member-avatar card through the "Gacha", and issues a card which is selected based on a predetermined algorithm from a group of a plurality of member-avatar cards which are respectively derived from a plurality of members (the card becomes possessed by the member). It goes without saying that "Gacha" is a virtual card dispenser digitized on an IT network.

Another typical card-issuing process is a unique one associated with the core of this invention. It is assumed that, as a result of a member Taro's play of the master game, a warrior-commander in the playing history data whom Taro has defeated has promoted in rank. When at a suitable opportunity it is recognized that the warrior-commander has promoted by a predetermined ranks or more (i.e., 2 ranks or more) (as a matter of course, a process of comparing old and new data is needed), the Taro avatar card is issued to Taro himself in the card-issuing process and is possessed by Taro.

Circulation of Cards

In the same way as existing card games that are well known as social games, trading cards among members enables the member-avatar cards to be circulated. In addition, the new card game of this invention does not relate to the rule of the game. Therefore, in the same way as common battle card games, it is possible to circulate the member-avatar cards according to battle results.

Defining Matters of This Invention

As described in detail above, a method for computing in a social game (system) which is the core of this invention is defined by the following matters (1) to (5).

(1) a method (system) for computing in a social media providing a computing environment in which members are visualized with their avatars respectively associated with the members and the members socialize (2) including an environment in which the members play the master game and the slave game, and storing and managing, for each of the members, playing history data of the master game and playing history data of the slave game (3) having the slave game that is a battle card game and describing in the playing history data card information of cards possessed by each of the members (4) having a process of managing the slave game, the process including a card-issuing process in which a member-avatar card that is used for playing the card game and is derived from each member is issued and is possessed by any of the members (5) producing the member-avatar card as a character card in which each member is visualized with an avatar associated with the member, and setting a battle parameter of a member-avatar card derived from a certain member, based on a content that is recorded as the certain member's playing history data of the master game at the time of issuing of the card

What is claimed is:

1. A non-transitory computer-readable storage medium of an electronic game system with a game program stored thereon, the electronic game system comprising a processor and a memory, the game program instructing the electronic game system to perform the following processes:

storing and managing playing history data as correlated to each of members who play both a first game and a second game on the electronic game system, the storing and managing being performed each time the member plays the first game, the playing history data being based on a result of the first game;

issuing to a certain member an electronic member-avatar card which is derived from one of the members, the issuing being performed when the certain member plays the second game, the second game being linked to the first game; and determining a parameter of the member-avatar card issued to the certain member, the determining being performed based on the playing history data of the first game at the point of time when the member-avatar card is issued, the playing history data of the first game being correlated to the one from whom the member-avatar card is derived.

2. The non-transitory computer-readable storage medium according to claim 1, wherein in the issuing of the member-avatar card to the certain member, the issuing is triggered by updating the playing history data of the first game beyond a predetermined criterion, the playing history data of the first game being correlated to the certain member.

3. The non-transitory computer-readable storage medium according to claim 1, wherein in the issuing of the member-avatar card to the certain member, the member-avatar card which is issued is a member-avatar card that is selected based on a predetermined algorithm from a group of a plurality of member-avatar cards which are respectively derived from the members.

4. The non-transitory computer-readable storage medium according to claim 1, wherein the game program instructs the computer to perform:
a process of generating visualization data based on avatar setting information,
the visualization data being data for displaying on a game screen the member-avatar card designated by the certain member, and
the avatar setting information being associated with an avatar made by combination of a plurality of avatar elements selected by the one from whom the member-avatar card is derived.

5. The non-transitory computer-readable storage medium according to claim 1, wherein, when the certain member plays the second game and battles another member using the member-avatar card possessed by the certain member, if the another member defeats the certain member, the game program instructs the computer to perform a process of causing the another member to acquire the member-avatar card possessed by the certain member.

6. An electronic game system, comprising a processor and a memory and further comprising:

a section that stores and manages playing history data as correlated to each of members, who play both a first game and a second game on the electronic game system, the storing and managing being performed each time the member plays the first game, the playing history data being based on a result of the first game;

a section that issues to a certain member an electronic member-avatar card which is derived from one of the members, the issuing being performed when the certain member plays the second game, the second game being linked to the first game; and a section that determines a parameter of the member-avatar card issued to the certain member, the determining being performed based on the playing history data of the first game at the point of time when the member-avatar card is issued, the playing history data of the first game being correlated to the one from whom the member-avatar card is derived.

* * * * *